(No Model.) 2 Sheets—Sheet 2.
J. F. PORTER.
EVAPORATING PAN.
No. 326,149. Patented Sept. 15, 1885.
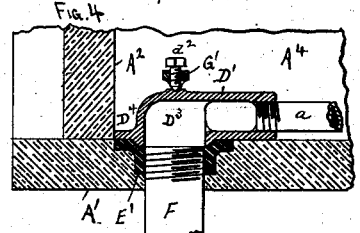
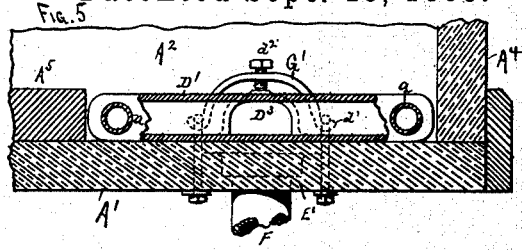
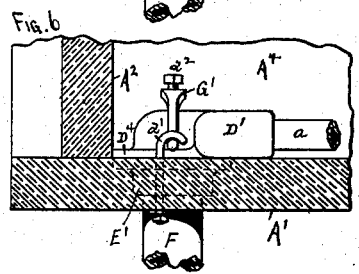
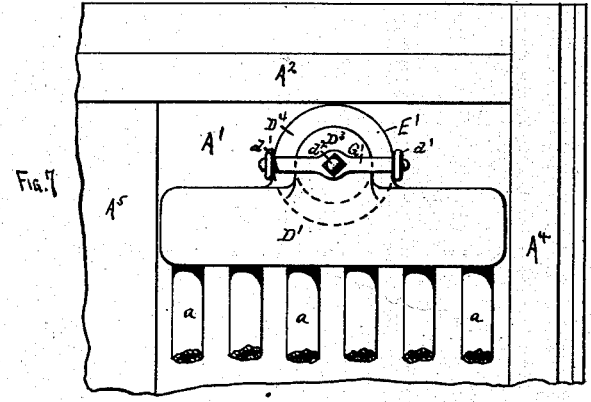
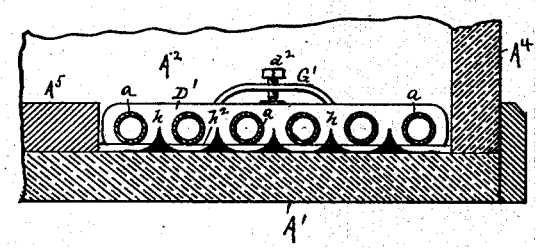
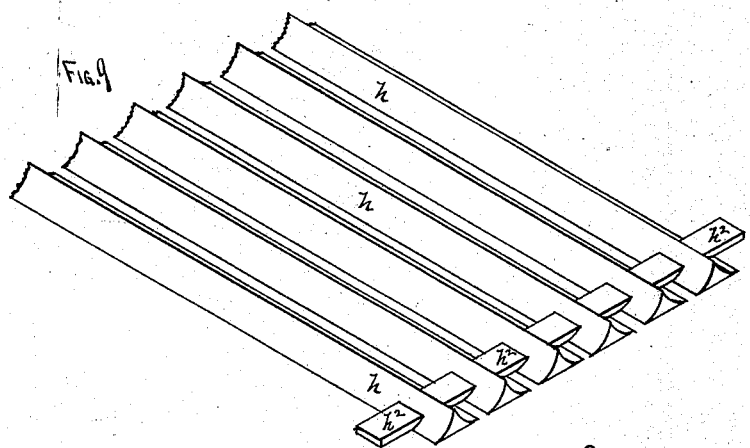
WITNESSES.
H. S. Webster,
Arthur S. Brown.
John F. Porter:
INVENTOR BY
Charles N. Woodward
Atty.
N. PETERS. Photo-Lithographer, Washington, D. C.

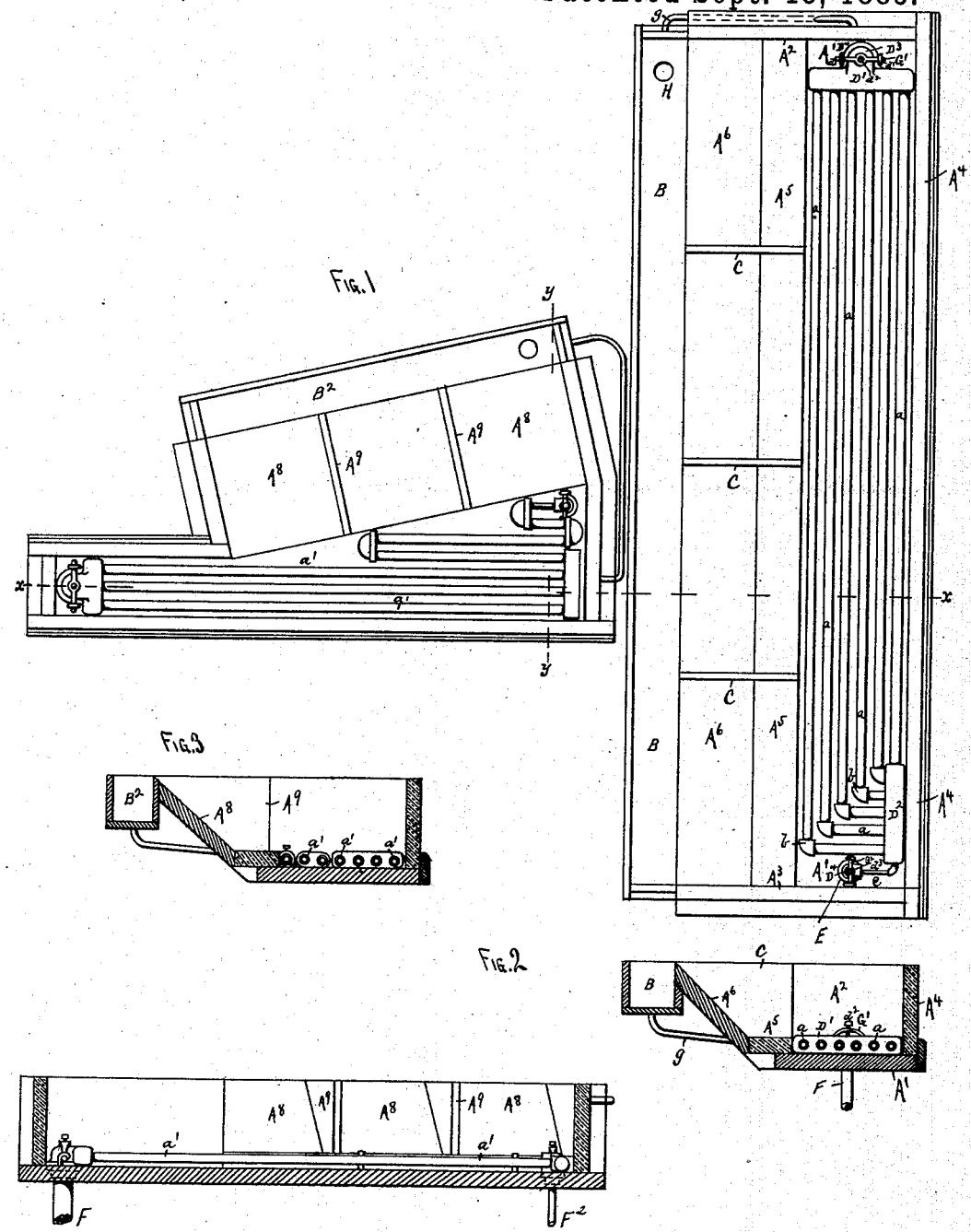

UNITED STATES PATENT OFFICE.

JOHN F. PORTER, OF RED WING, MINNESOTA.

EVAPORATING-PAN.

SPECIFICATION forming part of Letters Patent No. 326,149, dated September 15, 1885.

Application filed December 27, 1884. (No model.)

*To all whom it may concern:*

Be it known that I, JOHN F. PORTER, a citizen of the United States, and a resident of Red Wing, in the county of Goodhue, in the State of Minnesota, have invented certain new and useful Improvements in Evaporating-Pans, of which the following is a specification.

Figure 1 is a plan view of one of the evaporating-pans and a finishing-pan. Fig. 2 is a cross-section on the line $x\,x$ of Fig. 1. Fig. 3 is a cross-section of the finishing-pan on the line $y\,y$ of Fig. 1. Figs. 4, 5, and 6 are enlarged sectional details of the mechanism for securing the removable system of steam-piping in the pans. Fig. 7 is a plan view of Fig. 5. Fig. 8 is an enlarged cross-sectional view illustrating the manner of arranging the sugaring attachment in the pans. Fig. 9 is an enlarged detached perspective view of a portion of the sugaring attachment.

This invention relates to the evaporating apparatus used in the manufacture of sirup and sugar; and it consists in the construction and arrangement of parts, as hereinafter described and shown.

The apparatus consists, usually, of four evaporating-pans and one finishing-pan; but one or more evaporating-pans and one finishing-pan may be used, as circumstances may require.

In the drawings, for the purpose of illustration, I have shown one evaporating-pan and one finishing-pan. Both the evaporating-pans and finishing-pan will be arranged to be adjusted as in my patent of February 14, 1884. The pans may be constructed of wood or metal, as preferred; but in the drawings they are shown of wood, $A'$ being the bottom, $A^2\,A^3$ the ends, and $A^4$ one of the sides, the latter and the ends being upright and at right angles to the bottom. On the opposite side of the pan from the side $A^4$ the bottom is raised slightly and extended outward a short distance, as shown at $A^5$, and the other side, $A^6$, of the pan connected to the outer edge of this raised portion and carried off at an angle, as shown, and the ends $A^2\,A^3$ formed angular to conform thereto, the whole thus forming a pan with one side perpendicular and the other side inclined, as more clearly shown in Fig. 2.

A trough, B, may be suspended along beneath the upper edge of the side $A^6$ to receive the "scum," as hereinafter shown.

Across the space occupied by the raised section $A^5$ and inclined side $A^6$, at suitable intervals, are division plates or walls C, to form stops to prevent the formation of currents in the sirup, as hereinafter shown.

In the bottom of the pan a system of steam-pipes is arranged as follows: $a\,a$ represent a series of metal pipes, each secured by one end in a manifold, $D'$, and each secured by its other end in a manifold, $D^2$, the latter lying at right angles to the manifold $D'$, and the pipes $a$ provided with elbow-connections $b$, so that an "expansion" connection is formed between the two manifolds.

The manifold $D'$ has an extension, $D^3$, from its rear side opening downward, and having a steam-tight joint connecting it with a metal thimble or bushing, $E'$, set into the bottom $A'$ of the pan, and into which bushing the main steam supply-pipe F is secured.

The extension $D^3$ has a flange, $D^4$, on which a ring or lip is formed, adapted to fit into a corresponding cavity in the bushing $E'$, so that the union may be easily and quickly made between the parts.

$G'$ is a "yoke" adapted to be set over the extension $D^3$, and be held by its ends beneath hooks $d'$ rising from the bottom of the pan, and provided with a set-screw, $d^2$, adapted to be set down upon the top of the extension $D^3$, by which means the extension $D^3$, manifold $D'$, and its attached pipes $a$ may be firmly held down upon the bushing, and a steam-tight joint thereby insured between the parts. A rubber packing may be placed in the joint, if required.

The construction and arrangement of the manifold $D'$ and the manner of connecting it with the bushing $E'$ is more fully shown in the enlarged views in Figs. 4, 5, 6, and 7.

From the ends of the manifold $D^2$, next the end of the pan, a smaller pipe, $e$, leads to a hollow casting, $D^4$, similar to the extension $D^3$, and adapted to be connected to a bushing similar to the bushing $E'$, from which a small pipe leads, thus forming a "drip" or overflow for the condensed water of the steam-pipes. The pipe $F^2$ will be run into a "trap," so that the steam will not escape through it.

The casting $D^4$ will be provided with a yoke,

G², and set-screw d³ similar to the yoke G' and set-screw d².

By this simple arrangement the whole system of piping may be easily removed from and replaced in the pan by merely releasing the yokes G' G². This is a great advantage, as the pipes and pans require frequent cleansing from the adhering sirup and sugar, and by being able to remove the pipes bodily from the pan the latter is left free from obstruction and easily washed out, while the pipes themselves are also much more easily handled than when fixed in the pans.

Another important feature gained by this arrangement is that all parts of the manifolds and pipes are beneath the surface of the sirup when the pans are in use; hence the sirup will not "burn" upon the pipes at the line of contact between the air and sirup, of which there is constant danger where the pipes project up above the surface of the sirup.

The manifolds will be formed of a flat oval in cross-sections, so that they will occupy as little perpendicular space as possible.

The inclined side A⁶ forms a means for skimming the sirup, the scum rising to the surface and naturally floating off over the less heated sirup above the inclined side, where it is easily scraped off and up the incline and into the trough B. Some of the sirup will be carried off with the scum, and will settle to the bottom of the trough B, from whence it will be drawn by a pipe, g, back again to the feed end of the pan.

An outlet, H, will be provided at one end of the trough B, through which the accumulated scum may be removed.

The sirup in that part of the pan above the inclined side A⁶ is colder than that above the steam-pipes; hence the mass of sirup is inclined to form currents between the highly-heated and less heated parts, the general run being up the pan over the steam-pipes and down the pan over the inclined side A⁶. This is objectionable, as it draws the scum back toward and mixes it with the green sirup, and to avoid this I arrange the walls C across the inclined side A⁶, which break up the cool portion of the sirup and prevent the formation of currents therein. This is a very important feature of my invention.

The finishing-pan is constructed similar to the evaporating-pan, except that it is narrow for about one-third of its length and is widened the remainder of its length, as shown, the narrow part being at the finishing end of the pan. A system of piping, a', will be arranged in the bottom of the finishing-pan similar to the piping a of the evaporating-pan, except that it is extended at the enlarged end to completely fill the space on the floor of the pan, as shown. The piping in the finishing-pan will be formed and attached to the pan and manifolds in the same manner as in the evaporating-pan, with only such modifications as the peculiar form of the pan requires. One side of the wide end of the finishing-pan will be provided with an inclined side, A⁸, walls or stops, A⁹, and scum-receiving trough B², similar to and for the same purpose as the like parts in the evaporating-pan. The steam is fed to the finishing-pan at its narrow end, so that the greatest heat will be supplied to the sirup at the "finishing" part of the process.

The finishing of sirup is a very delicate process, and to conduct it properly the operator must have complete control of the heat, and keep all parts of the sirup at a uniform temperature, or adverse currents will be formed and mix the unfinished and finished sirup and discolor it and deteriorate its value.

By reducing the width of the pan from the inlet toward the outlet or finishing end I am enabled to confine the sirup, as it approaches its completion, to narrow limits, and thus more easily and surely control it and keep it at a uniform temperature and prevent the formation of adverse currents.

In making sirup the pans will be used as shown in Figs. 1 and 2; but when making sugar I place in the pans, between each pair of the pipes a and a', a triangular strip of wood, h, (see Figs. 8 and 9,) which projects upward between the pipes and displaces the bulk of sirup and confines the great mass of the sirup above the pipes where the heat is more effective. A set of these wooden strips h are shown arranged in the pan in Fig. 8. The strips will be formed hollow on their two upper surfaces, being a little nearer the surface of the pipes at their lower corners than at their upper corners, while their lower surfaces lie flat upon the bottom or floor A' of the pan. For convenience of placing in position and keeping them in their proper positions with relation to the pipes, the wooden strips h will be connected together at their lower edges by transverse tie-strips h² at suitable intervals.

In making sugar, little if any crytaillization arises from the sirup below the medium of the heat; hence by the use of the wooden strips h a very small percentage of the sirup is left below the pipes a and a', and the "sugaring" is conducted with greater economy and with very much more satisfactory results than when the wooden strips are not used. These wooden strips will also be used in the finishing-pan, the only difference being that they will be of different lengths to conform to the difference in the manner of arranging the piping.

Having thus described my invention, what I claim as new is—

1. An evaporating-pan composed of a single compartment having one side inclined outward, and having stop-walls arranged transversely at intervals on said inclined side but which do not extend across the main portion of the pan, whereby back currents along said inclined side are prevented, substantially as set forth.

2. An evaporating-pan, and steam inlet and drip pipes which enter said pan through the bottom thereof, in combination with a removable system of steam-pipes which rest on the bottom of said pan and are removably connected with said inlet and drip pipes, substantially as set forth.

3. An evaporating-pan, and a bushing set in the bottom thereof, in combination with a pipe which enters the bottom of said pan and terminates in said bushing, a casting which sets over said bushing, and a swinging yoke which holds said casting in place on said bushing, substantially as set forth.

4. The manifold $D'$, having extension $D^3$, in combination with the swinging yoke $G'$, which passes over said extension and holds said manifold in place, substantially as set forth.

5. The manifold $D'$, having extension $D^3$, in combination with the swinging yoke $G'$, which passes over said extension, and a set-screw $d^2$, which passes through said yoke and presses against said extension, substantially as set forth.

6. In an evaporating-pan, a bushing, $E'$, set into the bottom of said pan and having a steam-pipe, $F$, fitting into it, a manifold, $D'$, from which pipes $a$ lead, and having an extension, $D^3$, fitting over said bushing, manifold $D^2$, adapted to receive the opposite ends of said pipes, drip-pipe $e$, connecting said manifold $D^2$ with a hollow connection, and an outlet, $F^2$, leading from said hollow connection through the bottom of said pan, substantially as set forth.

7. An evaporating-pan consisting of bottom $A'$, perpendicular side $A^4$, and ends $A^2$ $A^3$, inclined side $A^6$, raised section $A^5$, and a system of steam-piping lying in the bottom of said pan, on a line even with or below the top of said raised extension, and adapted to be supplied with steam through the bottom of said pan, whereby all parts of said piping come below the surface of the sirup in the pan, substantially as set forth.

8. In an evaporating apparatus, a finishing-pan composed of a single compartment whereby an unobstructed flow of the sirup from the receiving to the finishing end thereof is permitted, said compartment being of a length greater than its width, and of a width which is less at the finishing than at the receiving end, whereby the sirup as it approaches completion is confined and is thus easily manipulated, substantially as set forth.

9. In an evaporating apparatus, a finishing-pan of decreasing width from the receiving end toward the finishing or discharge end, and having a portion of one side, $A^8$, inclining outward and provided with transverse stop-walls $A^9$, substantially as set forth.

10. An evaporating-pan, and steam-pipes at the bottom thereof, in combination with triangular filling-strips between and below adjacent steam-pipes, whereby the sirup is confined to the portion of the pan above said pipes, substantially as set forth.

11. An evaporating-pan, and a system of removable steam-pipes at the bottom thereof, in combination with a set of removable triangular filling-strips below said steam-pipes, each filling-strip being between adjacent steam-pipes, substantially as set forth.

In testimony thereof I have hereunto set my hand in the presence of two subscribing witnesses.

JOHN F. PORTER.

Witnesses:
C. N. WOODWARD,
H. S. WEBSTER.